(12) United States Patent
Aho et al.

(10) Patent No.: US 7,887,270 B2
(45) Date of Patent: Feb. 15, 2011

(54) APPARATUS FOR CUTTING AN OVAL HOLE IN THE WALL OF A PIPE

(75) Inventors: Tommi Aho, Vaasa (FI); Pasi Pirila, Ilmajoki (FI); Juha Ikola, Vaasa (FI)

(73) Assignee: T-Drill Oy, Laihia (FI)

( * ) Notice: Subject to any disclaimer, the term of this patent is extended or adjusted under 35 U.S.C. 154(b) by 458 days.

(21) Appl. No.: 10/594,414

(22) PCT Filed: Mar. 23, 2005

(86) PCT No.: PCT/FI2005/050105

§ 371 (c)(1),
(2), (4) Date: Jul. 29, 2008

(87) PCT Pub. No.: WO2005/092546

PCT Pub. Date: Oct. 6, 2005

(65) Prior Publication Data

US 2008/0286060 A1    Nov. 20, 2008

(30) Foreign Application Priority Data

Mar. 26, 2004   (FI)  .................................. 20045107

(51) Int. Cl.
*B23C 3/00*   (2006.01)
*B23C 1/20*   (2006.01)
*B23B 41/04*   (2006.01)
(52) U.S. Cl. ...................... 409/143; 409/179; 409/200; 409/231; 82/1.3
(58) Field of Classification Search ................. 409/143, 409/199, 200, 231–232, 178–179, 65, 74; 82/1.2, 1.3; 408/131, 147, 150, 153
See application file for complete search history.

(56) References Cited

U.S. PATENT DOCUMENTS 2,315,479 A  *  3/1943  Schwartz .................... 409/199

(Continued)

FOREIGN PATENT DOCUMENTS

DE        3208211 A1 *  9/1982

(Continued)

OTHER PUBLICATIONS

Machine Translation of DE 3208211, which '211 patent was published on Sep. 30, 1982.*

*Primary Examiner*—Erica E Cadugan
(74) *Attorney, Agent, or Firm*—Klauber & Jackson, LLC

(57) ABSTRACT

The invention relates to an apparatus for cutting an oval hole in the wall of a pipe. The pipe secured to a baseplate (1) of the apparatus is cut for an oval hole by means of a tool (20) having its cutter head (24) rotated about its axis while it is driven along a circular path in relation to a carriage (2) of the apparatus. The carriage (2) is mounted on the baseplate (1) by way of linear runners (3). Adapted for rotation along with a drive pulley (4) of the tool (20) is a cogged wheel (10), which through the transmission of a cam lever (11) is adapted to drive a shaft (12) having its rotational motion transmitted on the one hand to drive a gear (22) and on the other hand to work the carriage (2) back and forth in relation to the baseplate (1), a round-trip displacement (2x*a*) being equal to a difference between the major axis and the minor axis of a desired ellipse.

8 Claims, 2 Drawing Sheets

U.S. PATENT DOCUMENTS

| | | | |
|---|---|---|---|
| 3,526,167 A * | 9/1970 | Escobedo | 409/200 |
| 3,554,082 A * | 1/1971 | Faulcon | 409/200 |
| 4,306,598 A * | 12/1981 | Peot | 409/179 |
| 4,503,693 A * | 3/1985 | Larikka | 72/71 |
| 4,786,219 A * | 11/1988 | Oberlin et al. | 409/84 |
| 5,201,618 A * | 4/1993 | Malarz et al. | 409/143 |
| 5,328,306 A * | 7/1994 | Rehm et al. | 409/231 |
| 5,730,036 A * | 3/1998 | Ozaki et al. | 409/199 |
| 5,876,161 A * | 3/1999 | Ikola et al. | 409/199 |
| 6,840,722 B1 * | 1/2005 | Nonaka | 409/200 |

FOREIGN PATENT DOCUMENTS

| | | | |
|---|---|---|---|
| DE | 3501421 A1 * | 8/1985 | |
| DE | 4019704 A1 * | 1/1991 | |
| SU | 1634725 A1 * | 3/1991 | |

* cited by examiner

APPARATUS FOR CUTTING AN OVAL HOLE IN THE WALL OF A PIPE

CROSS REFERENCE TO RELATED APPLICATIONS

The present application is a National Stage Application claiming the priority of co-pending PCT Application No. PCT/FI2005/050105 filed Mar. 23, 2005, which in turn, claims priority from Finnish Patent Application Ser. No. 20045107, filed Mar. 26, 2004. Applicants claim the benefits of 35 U.S.C. §120 as to the PCT application and priority under 35 U.S.C. §119 as to the said Finnish application, and the entire disclosures of both applications are incorporated herein by reference in their entireties.

The invention relates to an apparatus for cutting an oval hole in the wall of a pipe, said apparatus comprising a baseplate with elements for securing a pipe to be cut, a carriage supported on top of the baseplate for linear movement along runners, a drive pulley driven by a power unit and having an opening for a tool and an internal toothed rim meshing with an external toothed rim of the tool for rotating the same, a gear meshing with a second toothed rim of the tool for rotating it slowly, whereby a cutter head is carried by said slow rotational motion relative to the carriage along a circular path, the cutter head rotating at the same time about its own axis as a result of the relative difference in rotational speeds of the toothed rims.

The Applicant has used such an apparatus for a long time and it has proved highly beneficial. It is an object of the invention to develop this prior known apparatus further, such that the desired ovality or ellipticity of a hole is achieved with a simple and reliable mechanism, whereby the degree of ovality or the ratio between the major and minor axes of an ellipse is also readily adjustable.

This object is fulfilled by means of features as defined in the characterizing clause of the appended claim 1. Preferred embodiments of the invention are set forth in the dependent claims.

Figure 1:
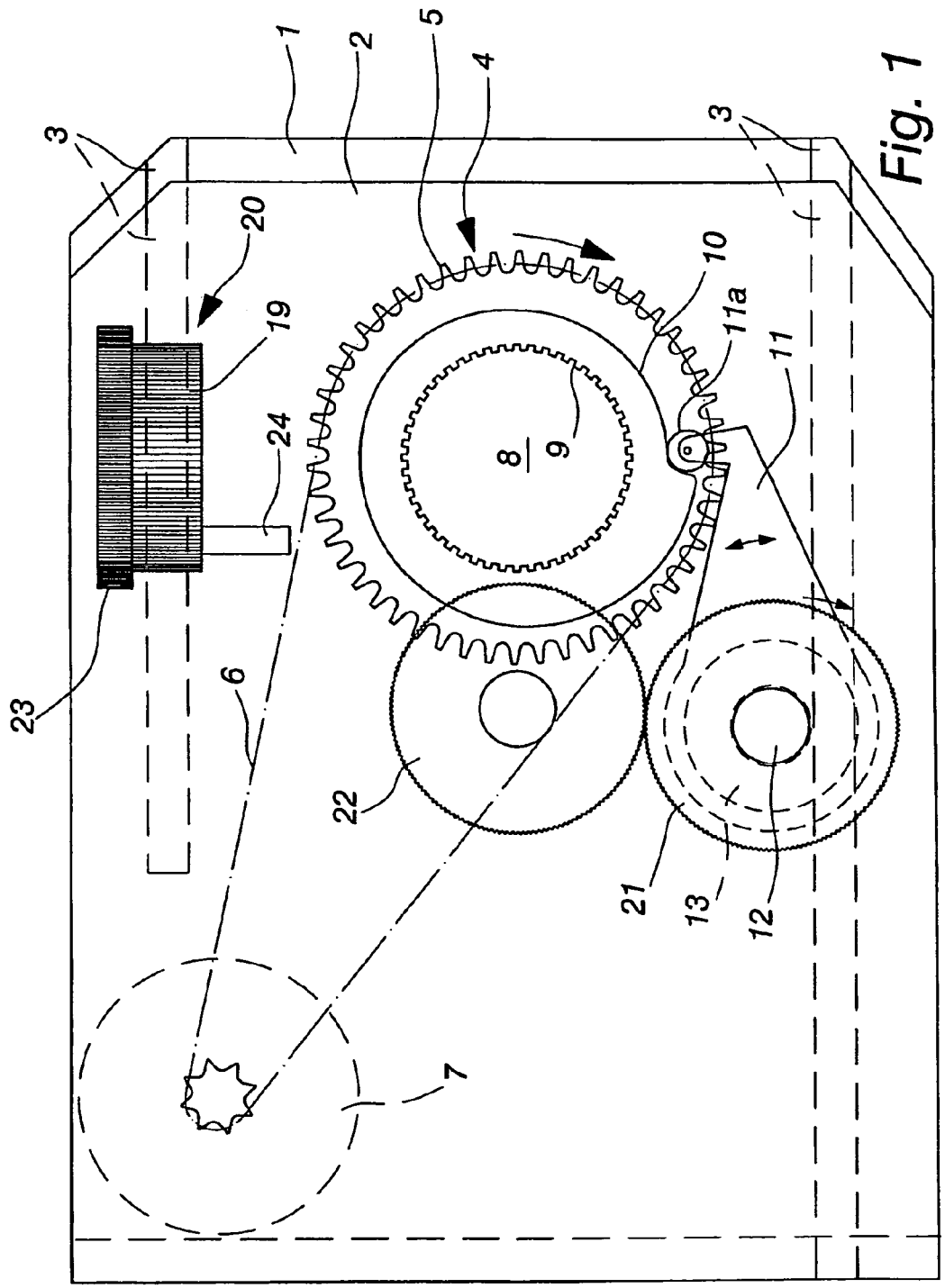
Figure 2:
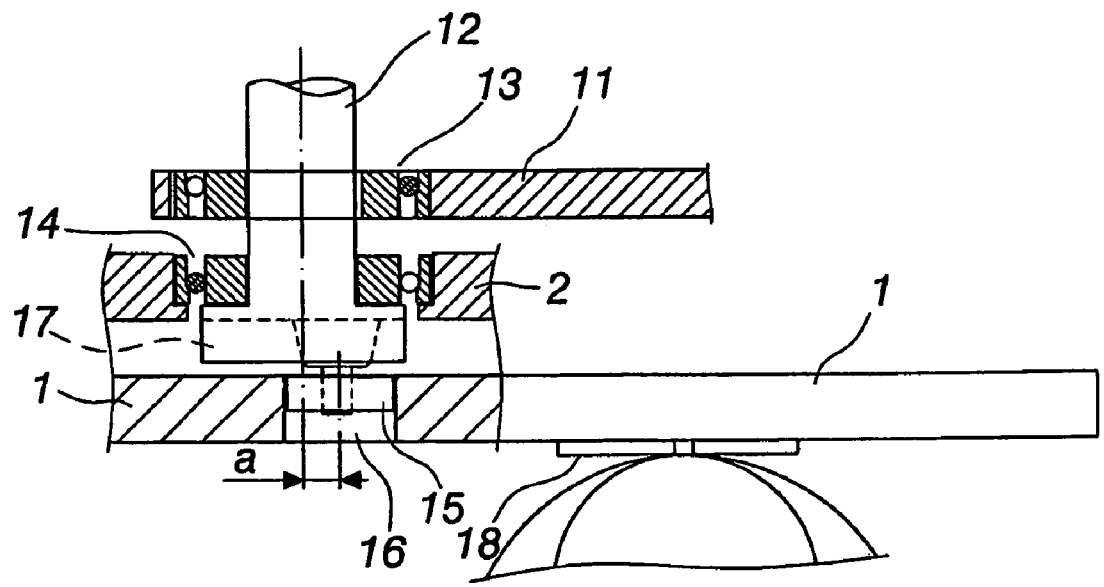
Figure 3:
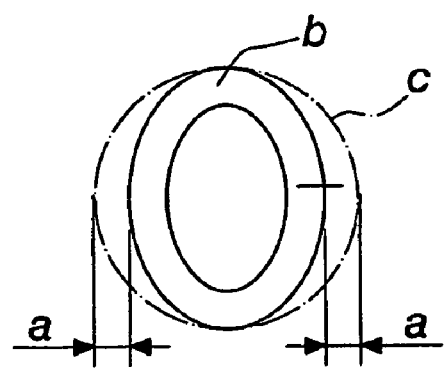

One exemplary embodiment of the invention will now be described in more detail with reference to the accompanying drawings, in which FIG. 1 shows in a plan view an apparatus of the invention regarding essential components, yet a tool 20 adaptable to the apparatus being shown in a side view, FIG. 2 shows an essential part of the invention in a section at a shaft 12 in FIG. 1, and FIG. 3 shows an elliptical hole b made with an apparatus of the invention.

The apparatus comprises a baseplate 1 provided with elements 18 for securing a pipe to be cut underneath the baseplate 1. A carriage 2 is supported on top of the baseplate 1 for linear movement along runners 3. Any linear bearings can be used, either slide bearings or those provided with rolling elements. On the carriage 2 is rotatably bearing-mounted a drive pulley 4 having an opening 8 for the tool 20. The centre axis of the opening 8 intersects that of a pipe to be cut and is perpendicular thereto. The drive pulley 4 is rotated by means of a chain or cogged belt 6, which is meshed with a cogwheel 5 encircling the drive pulley 4.

The drive pulley 4 has the inner surface of its opening 8 provided with a toothed rim 9, which is meshed with an external toothed rim 19 of the tool 20 for rotating the same relative to the body and a toothed rim 23 of the tool 20. This rotation of the toothed rim 19 drives a cutter head 24 about its own axis. A gear 22 meshes with the second toothed rim 23 of the tool 20 for rotating it slowly with respect to the carriage 2.

The cutter head 24 is carried by rotation of the toothed rim 23 slowly along a circular path with respect to the carriage 2 of the apparatus.

A cogged wheel 10 is mounted for rotation along with the drive pulley 4. A cam roller 11a present at the end of a cam lever 11 follows a cam surface of the cogged wheel 10, whereby, as the drive pulley 4 is rotating, the cam lever 11 turns slowly away from the centre axis of the drive pulley 4 until reaching a transition point shown in the figure, at which the cam lever 11 makes a quick return by the retraction or expulsion of a spring (not shown) as the cam roller 11a proceeds to the lowest point of the cam surface.

The cam lever 11 is fitted on a shaft 12 with a freewheel clutch 13, having its sense of rotation selected such that a gear 21 mounted on the shaft 12 rotates slowly in the arrow-pointed direction. The shaft 12 is fitted on the carriage 2 with a second freewheel clutch 14. The senses of rotation allowed by the freewheel clutches 13, 14 are opposite to each other. Thus, in each revolution of the drive pulley 4, the gear 21 proceeds through a rotational angle which corresponds to a swing angle of the cam lever 11, which is determined by the rising distance of the cogged wheel's 10 cam surface over each revolution. The toothed rim 23 of the tool 20 is rotated by the gear 21 through the transmission of the gear 22.

In addition to this, the shaft 12 has its rotary motion adapted to work the carriage 2 back and forth in relation to the baseplate 1. A round-trip displacement 2xa corresponds to a difference between the major axis and the minor axis of a desired ellipse, as detailed in FIGS. 2 and 3. For this reciprocating movement, the shaft 12 has its bottom end provided with a crank 15 in engagement with an opening 16 of the baseplate 1, which is elongated in the direction perpendicular to the runners 3. The crank 15 comprises a roller, having its attachment in a transverse groove 17 of a flange present at the shafts 12 bottom end. By displacing the attachment of the crank 15 in the groove 17, it is possible to adjust a length a of the crank lever while simultaneously adjusting the degree of ovality for an elliptical hole b to be formed, i.e. its deviation a from a circle c.

The combined use of slow rotation and reciprocating linear motion by means of the shaft 12 ensures further the fact that the movement of the cutter head 24 in its circular path c is always synchronized to a deviation from this path c inflicted by a linear displacement for establishing an ellipse.

The invention is not limited to the foregoing exemplary embodiment as its structural details may vary within the scope of the appended claims.

The invention claimed is:

1. An apparatus for cutting an oval hole in the wall of a pipe, said apparatus comprising a baseplate (1) with elements (18) for securing a pipe to be cut, a carriage (2) supported on top of the baseplate (1) for linear movement along runners (3), a drive pulley (4) driven by a power unit (7) and having an opening (8) for a tool (20) and an internal toothed rim (9) meshing with an external toothed rim (19) of the tool (20) for rotating the same, a gear (22) meshing with a second toothed rim (23) of the tool (20) for rotating it slowly, whereby a cutter head (24) is carried by said slow rotational motion relative to the carriage (2) along a circular path, the cutter head (24) rotating at the same time about its own axis driven by the toothed rims (9, 19), characterized in that adapted for rotation along with the drive pulley (4) is a cogged wheel (10), which through the transmission of a cam lever (11) is adapted to drive a shaft (12) whose rotational motion is transmitted on the one hand to drive the gear (22) and on the other hand to work the carriage (2) back and forth in relation to the baseplate (1), a round-trip displacement (2xa) being equal to a difference between the major axis and the minor axis of a desired ellipse.

2. An apparatus as set forth in claim 1, characterized in that the cam lever (11) is mounted on the shaft (12) with a freewheel clutch (13) and the shaft (12) is mounted on the carriage (2) with a second freewheel clutch (14), and that the senses of rotation allowed by the freewheel clutches (13, 14) are opposite to each other.

3. An apparatus as set forth in claim 2, characterized in that mounted on the shaft (12) is a second gear (21) rotating therealong to rotate the gear (22) which drives the tool (20, 23).

4. An apparatus as set forth in claim 3, characterized in that the shaft (12) has its bottom end provided with a crank (15) in engagement with an opening (16) of the baseplate (1), which is elongated in a direction perpendicular to the runners (3), and that the crank (15) has a crank lever with a length (a) that is adjustable.

5. An apparatus as set forth in claim 2, characterized in that the shaft (12) has its bottom end provided with a crank (15) in engagement with an opening (16) of the baseplate (1), which is elongated in a direction perpendicular to the runners (3), and that the crank (15) has a crank lever with a length (a) that is adjustable.

6. An apparatus as set forth in claim 1, characterized in that mounted on the shaft (12) is a second gear (21) rotating therealong to rotate the gear (22) which drives the tool (20, 23).

7. An apparatus as set forth in claim 6, characterized in that the shaft (12) has its bottom end provided with a crank (15) in engagement with an opening (16) of the baseplate (1), which is elongated in a direction perpendicular to the runners (3), and that the crank (15) has a crank lever with a length (a) that is adjustable.

8. An apparatus as set forth in claim 1, characterized in that the shaft (12) has its bottom end provided with a crank (15) in engagement with an opening (16) of the baseplate (1), which is elongated in a direction perpendicular to the runners (3), and that the crank (15) has a crank lever with a length (a) that is adjustable.

* * * * *